United States Patent [19]

Trimble

[11] Patent Number: 4,982,975
[45] Date of Patent: * Jan. 8, 1991

[54] COMPOSITE BICYCLE FRAME WITH PRESSURE MOLDED JUNCTURE

[76] Inventor: Brent J. Trimble, 265 Westridge Dr., Watsonville, Calif. 95076

[*] Notice: The portion of the term of this patent subsequent to Jul. 25, 2006 has been disclaimed.

[21] Appl. No.: 337,816

[22] Filed: Apr. 14, 1989

Related U.S. Application Data

[60] Division of Ser. No. 53,370, May 12, 1987, Pat. No. 4,850,607, which is a continuation-in-part of Ser. No. 861,983, May 12, 1986, abandoned.

[51] Int. Cl.⁵ ............................................. B62K 19/16
[52] U.S. Cl. .................................. 280/281.1; 264/258
[58] Field of Search ..................... 280/281.1, 282, 274; 264/257, 258

[56] References Cited

U.S. PATENT DOCUMENTS

| | | | |
|---|---|---|---|
| 2,370,726 | 3/1945 | Hess et al. | 280/281.1 |
| 3,493,240 | 2/1970 | Jenks | 280/610 |
| 3,641,230 | 2/1972 | Jenks | 264/152 |
| 3,755,037 | 8/1973 | Erwin | 156/185 |
| 3,833,242 | 9/1974 | Thompson | 280/281.1 |
| 4,047,731 | 9/1977 | Van Auken | 280/281.1 |
| 4,264,389 | 4/1981 | Staub et al. | 156/156 |
| 4,437,679 | 3/1984 | Campagnolo | 280/281.1 |
| 4,471,020 | 9/1984 | McCarthy | 428/309.9 |
| 4,479,662 | 10/1984 | Defour et al. | 280/281.1 |
| 4,493,749 | 1/1985 | Brezina | 280/281.1 |
| 4,513,986 | 4/1985 | Trimble | 280/288.3 |
| 4,548,422 | 10/1985 | Michel et al. | 280/288.3 |
| 4,613,146 | 9/1986 | Sharp et al. | 280/288.2 |
| 4,657,795 | 4/1987 | Foret | 280/281.1 |
| 4,673,451 | 6/1987 | Yamazawa | 156/172 |
| 4,705,286 | 11/1987 | Lauzier | 280/281.1 |
| 4,828,285 | 5/1989 | Foret et al. | 280/279 |
| 4,850,607 | 7/1989 | Trimble | 280/281.1 |
| 4,900,048 | 2/1990 | Derujinsky | 280/281.1 |

FOREIGN PATENT DOCUMENTS

| | | |
|---|---|---|
| 944173 | 6/1956 | Fed. Rep. of Germany . |
| 475337 | 5/1915 | France . |
| 839373 | 4/1939 | France . |
| 2576576 | 8/1981 | France .............................. 280/281.1 |
| 1163835 | 7/1986 | Japan . |
| 1361394 | 7/1974 | United Kingdom . |

OTHER PUBLICATIONS

Article entitled "Cycles", Sept., 1986 issue of *Popular Mechanics* by Norman Mayersohn, pp. 46 and 48.
English Translation of French Patent No. 475,337.
English Translation of German Patent No. 944,173.
Article entitled "Sanderson Outruns High Technology to Win ABC Time Trial", May 13, 1985 edition of *Anchorage Daily News* by Lew Freedman, p. C-10.
Partial English Translation of French patent No. 839,373.
Brent J. Trimble's Declaration of Pre-Filing Activity dated Sept. 30, 1987 filed in related U.S. Application Ser. No. 861,983 filed May 12, 1986.
Article Published in the Anchorage Daily News on May 13, 1985.
Article Published in *Bicycle Guide* Dec. 1985 Issue, p. 74.
Article Published in *Bicycle Guide Aug., 1987 Issue Entitled "Kestral 4000"*, pp. 30-35.
Article Published in *Bicycle Guide* Aug. 1987 issue entitled "A Taste of the Future", pp. 20-29.

(List continued on next page.)

*Primary Examiner*—Charles A. Marmor
*Assistant Examiner*—Alan M. Kager
*Attorney, Agent, or Firm*—Pollock, Vande Sande & Priddy

[57] ABSTRACT

A cycle frame having a generally hollow unitary component of composite material connecting at least two support members. The frame component includes at least one pressure molded juncture comprising overlapping layers of resin impregnated fibrous material provided by overlapped parts of at least two adjacent wall sections.

22 Claims, 4 Drawing Sheets

OTHER PUBLICATIONS

Brent J. Trimble's Supplemental Declaration on Pre-Filing Activity dated Feb. 14, 1989 filed in Related U.S. Application Ser. No. 149,984, filed Jan. 29, 1988.

Bicycling Magazine, Jul., 1986, pp. 66-68, 70-72, 74 and 78-79.

Affidavit of Derujinsky as filed Nov. 21, 1988 in USSN 105,121 now USP 4,900,048.

Bicycling magazine, Jun., 1987, the Cover and pp. 40, 42, 160 and 162, Kestral 4000.

Bicycle Guide Magazine, Aug., 1987, pp. 36-39 and 68, Look Kevlar 2000.

Declaration of Pre-Filing Activity dated Sep. 30, 1987, filed Jan. 29, 1988, in related application Ser. No. 149,984.

Supplemental Declaration on Pre-Filing Activity dated Feb. 14, 1989, filed Feb. 15, 1989, in related application Ser. No. 149,984.

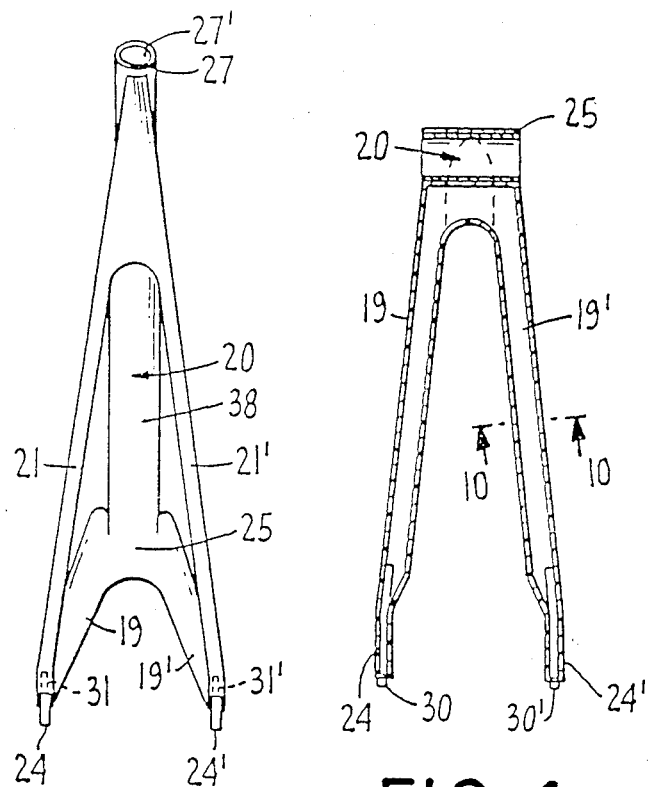
FIG. 3  FIG. 4
FIG. 5
FIG. 6
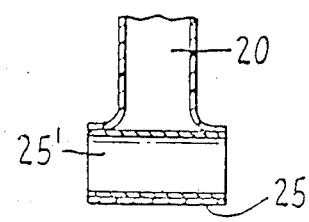 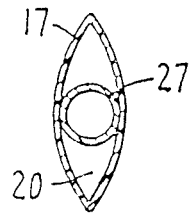 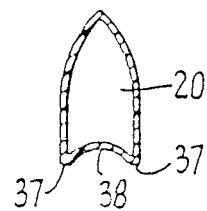
FIG. 9  FIG. 2  FIG. 7
FIG. 10
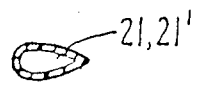
FIG. 12
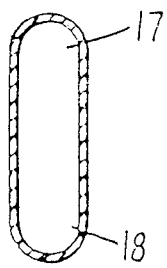
FIG. 11
FIG. 8

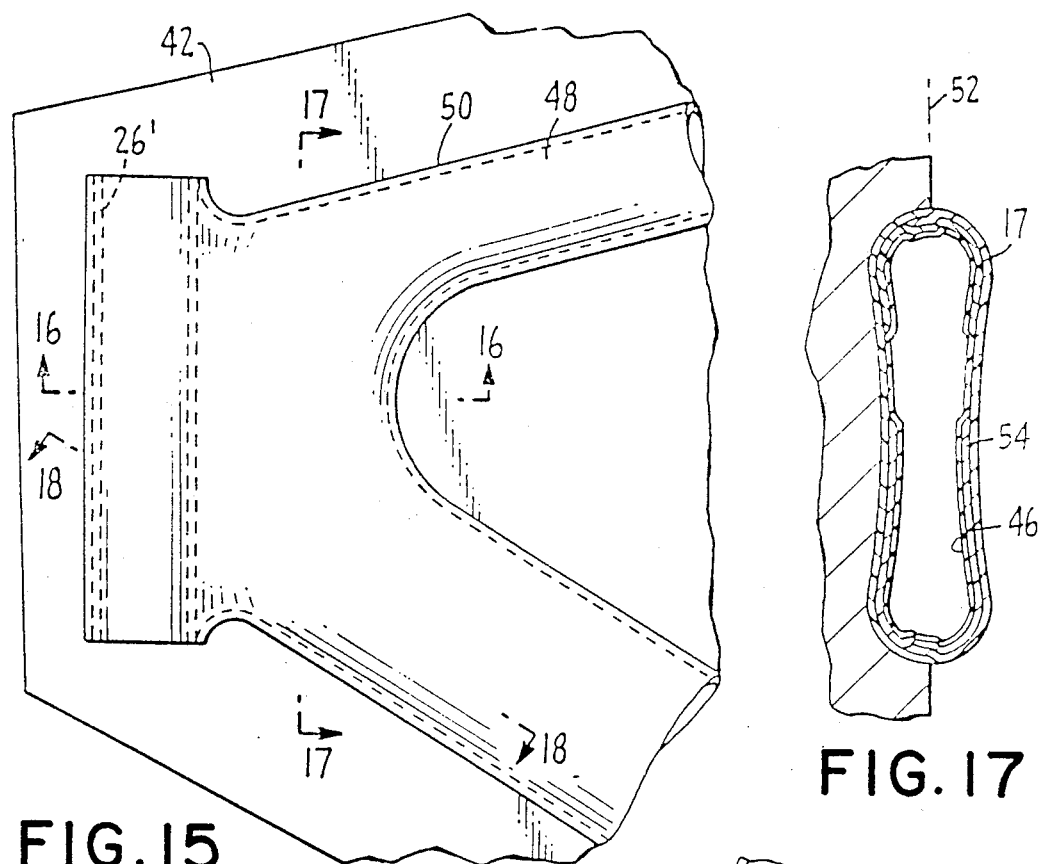
FIG.15
FIG.17
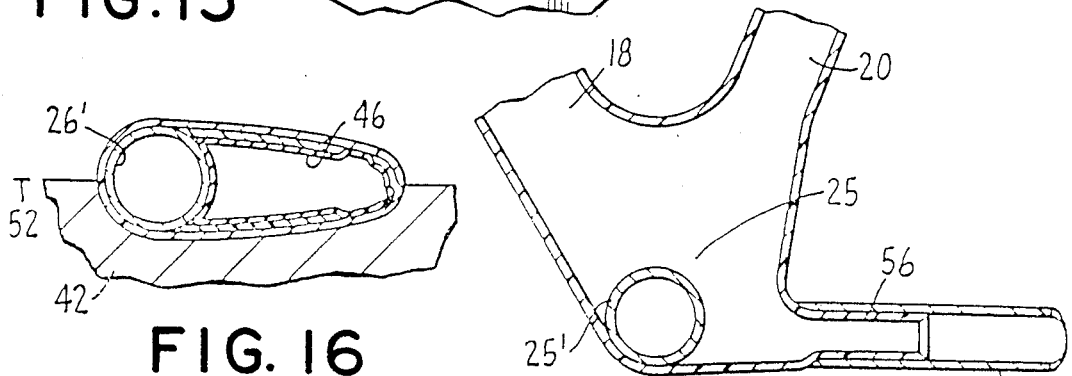
FIG.16
FIG.19
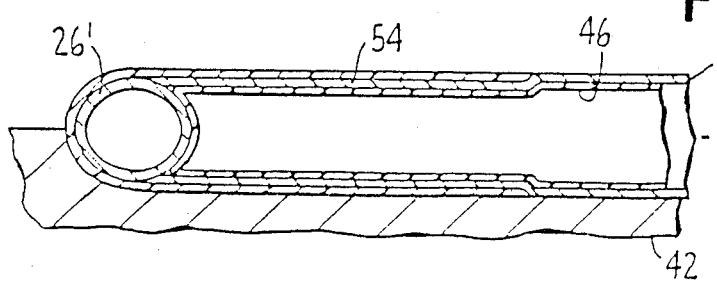
FIG.18

COMPOSITE BICYCLE FRAME WITH PRESSURE MOLDED JUNCTURE

RELATED APPLICATION DATA

This application is a division of Application Ser. No. 07/053,370 filed May 12, 1987, is now U.S. Pat. No. 4,850,607, which is a continuation-in-part of commonly owned and copending U.S. Patent Application Ser. No. 861,983, filed May 12, 1986, now abandoned.

TECHNICAL FIELD

The present invention relates to bicycle frames. In particular, the present invention relates to high performance, ultralight bicycle frames made from composite materials, and to methods for producing bicycle frames.

BACKGROUND ART

Conventional bicycle frames are assemblies built from individual tubes which are secured together by tubes. The individual frame tubes were, early on, designated by their location in relation to the other major components or assemblies used to make up the functioning bicycle. Thus it was that the short frame tube which supported the handlebar assembly and the front forks was referred to as the "head" tube, the tube which supported the seat and connected to the pedal axle support (the bottom bracket) was referred to as the "seat" tube, the tube which joined the seat tube and the head tube was referred to as the "top" tube, the tube which descended from the head tube to the bottom bracket was referred to as the "down" tube, the pair of tubes which descended from the seat tube to the ends of the rear wheel axle, with one tube on either side of the rear wheel, were referred to as the "seat stays", and the pair of tubes which connected the bottom bracket to the ends of the seat stays at the rear wheel axle, with one tube on either side of the rear wheel, were referred to as the "chain stays".

The multiplicity of connections required to secure these individual structural parts together, combined with the different forces encountered by the bicycle as it is ridden, cause a variety of problems. It is not unusual, for example, for one or more of the joints or connections on a conventional bicycle frame to fail, making the entire frame unsuitable for use until the connection is repaired. For many frames, the cost of straightening the frame and repairing the connection is prohibitive.

Further, the individual tubes are relatively heavy since they are generally made by the extrusion of or by the rolling and seaming of a metal alloy. The manufacture and assembly of these multiple structural parts is also time consuming and costly.

Finally, most conventional bicycle frame tubes have generally circular cross sections, since they are made from standard, commercial tubing. Thus, due both to the shape of the tubes and to the multiplicity of connection joints, conventional frames are not particularly adaptable to improved aerodynamics.

Some of the above problems have been addressed by prior inventors. For example, U.S. Pat. No. 4,513,986 to Trimble provides a monocoque type frame having a stressed, unitary outer skin over internal stiffening ribs and other structural elements U.S. Pat. No. 3,833,242 to Thompson, Jr. provides a hard exterior skin covering a structural foam interior. These frames may provide aerodynamic advantages over conventional bicycle frames, due to the aerodynamic shape and unitary nature of the outer skin. However, these frames generally require the interconnection of a large number of interior structural support elements such as shear webs, reinforcing angles, reinforcing blocks and strips, and joining blocks, and/or the presence of structural foam in the interior to support the frame, thus sharing certain deficiencies of conventional frames. In addition, while possibly improving aerodynamic performance in forward motion, a stressed skin will increase the frame's sensitivity to cross winds.

Thus, the need exists for a unitary, strong, lightweight bicycle frame which is aerodynamic, easy to construct and adaptable to mass production techniques. The present invention solves these problems by providing a one-piece, generally hollow, aerodynamic bicycle frame requiring no internal structural components, and constructed from inexpensive, lightweight and strong composite materials.

SUMMARY OF THE INVENTION

The present invention provides a unitary, ultralight, generally hollow bicycle frame having no internal structural components, and a method of manufacturing such a frame.

In one embodiment, the present invention provides a generally hollow, tubular one-piece bicycle frame having a steering support means, a seat support means, a pedal support means, a rear wheel support means, a top tube portion, a down tube portion, a seat tube portion, a chain stay portion and a seat stay portion, constructed using layers of structural fibers usable to make composite materials, and resin.

In another embodiment, the present invention provides a generally hollow unitary bicycle frame having a steering support means, a seat support means, a pedal support means, a rear wheel support means, a top tube portion, a down tube portion, a seat tube portion, a chain stay portion, and a seat stay portion, constructed using layers of heat curable resin impregnated fiberglass fibers, carbon fibers and KEVLAR ® fibers.

In various embodiments, the cross sectional shape of selected portions of a frame of the present invention may be altered, depending upon the position of the portion, to improve the aerodynamic behavior of the frame, without attendant increased cross wind sensitivity.

In yet another embodiment, the present invention provides a method for manufacturing unitary, generally hollow ultralight bicycle frames using structural fibers and resins, in which the fibers and resins are initially shaped around mandrels having the approximate size and shape of the hollow interior of the various finished portions of the frame. After this initial layup, these hollow portions are removed from the mandrels and are united by using hollow corner patches comprising multiple layers of fiber strips and resin. Inflatable bladders are preferably placed in the larger hollows found in the top tube portion, down tube portion, and seat tube portion, and a solid piece of foam made from a heat expandable resin composition is provided in the smaller hollows of the seat stay and chain stay portions. Alternatively, a foamable liquid resin may be used in place of all or part of the bladders, solid foam or both. The frame is then placed in a mold, the bladders are inflated to compress the layers of fiber and resin against the walls of the mold and the curing process is initiated by applying heat to the mold. Further compression of the layers of fiber and resin occurs as the pressure within the bladder and the pressure caused by expansion of the foam in the seat stay and chain stay portions increases as the temperature rises. When curing is complete, the frame is removed from the mold, any inflatable bladders are removed, and any foam in any of the portions may be removed by dissolution in an appropriate solvent.

In yet another embodiment, the present invention provides a method for manufacturing a generally unitary ultralight bicycle frame in which a unitary, generally hollow main component of the frame comprising at least two hollow tube portions integrally united by a hollow junction may be formed and precured in a main mold. One or more of the other hollow portions of the frame may be formed and precured independently and then connected to the main component using adhesive connections. Alternatively, precured hollow tube or stay portions may be attached to an uncured main unitary frame component comprising at least two hollow tube portions integrally united by a hollow junction so that the precured portions are adhesively bonded into the frame as the main unitary component is cured.

BRIEF DESCRIPTION OF THE DRAWINGS

A better understanding of the invention and its advantages will be apparent from the detailed description taken in conjunction with the accompanying drawings in which:

FIG. 2 is a sectional view of the hollow junction for supporting the seat support sleeve of a frame of the present invention, taken along line 2—2 of FIG. 1;

FIG. 3 is a rear perspective view of a frame of the present invention;

FIG. 4 is a sectional view of a frame of the present invention, taken along line 4—4 of FIG. 1;

FIG. 5 is a sectional view of the down tube portion of a frame of the present invention, taken along line 5—5 of FIG. 1;

FIG. 6 is a sectional view of the top tube portion of a frame of the present invention, taken along line 6—6 of FIG. 1;

FIG. 7 is a sectional view of the seat tube portion of a frame of the present invention, taken along line 7—7 of FIG. 1;

FIG. 8 is a sectional view of the junction between the top tube portion and the down tube portion of a frame of the present invention taken along line 8—8 of FIG. 1;

FIG. 9 is a sectional view of the junction between the seat tube portion and the down tube portion of a frame of the present invention taken along line 9—9 of FIG. 1;

FIG. 10 is a sectional view of one of the chain stay portions of a frame of the present invention taken along line 10—10 of FIG. 1;

FIG. 11 is a fragmentary sectional view of a portion of the junction for supporting the steering assembly in a frame of the present invention taken along line 11—11 of FIG. 1;

FIG. 12 is a sectional view of one of the seat stay portions of a frame of the present invention taken along line 12—12 of FIG. 1;

FIG. 15 is a fragmentary plan view of the mold and head tube junction of the frame with the top half of the mold removed for clarity.

FIG. 16 is a fragmentary elevational view in section taken along line 16—16 of FIG. 15.

FIG. 17 is a fragmentary elevational view in section taken along line 17—17 of FIG. 15.

FIG. 18 is a fragmentary elevational view in section taken along line 18—18 of FIG. 15.

FIG. 19 is a fragmentary cross-sectional view of the pedal support means and a connected chain stay illustrating a means of connecting stays when the front triangle is molded as an independent integral piece.

DETAILED DESCRIPTION OF THE INVENTION

The present invention provides an ultralight, generally hollow, unitary bicycle frame having no internal structural components, and a method of manufacturing such a frame.

In one embodiment, the present invention provides a generally hollow, unitary tubular bicycle frame having a steering support means, a seat support means, a pedal support means, a rear wheel support means, a top tube portion, a down tube portion, a seat tube portion, a chain stay portion and a seat stay portion, constructed using layers of resin impregnated structural fibers usable to make composite materials.

In another embodiment, the present invention provides a generally hollow, unitary bicycle frame having a steering support means, a seat support means, a pedal support means, a rear wheel support means, a top tube portion, a down tube portion, a seat tube portion, constructed using layers of resin impregnated fiberglass fibers, carbon fibers and KEVLAR ® fibers.

In various embodiments of the present invention, the cross-sectional shape of selected portions of the frame may be altered to improve the aerodynamic behavior of the frame, without attendant increased cross wind sensitivity.

Figure 1:
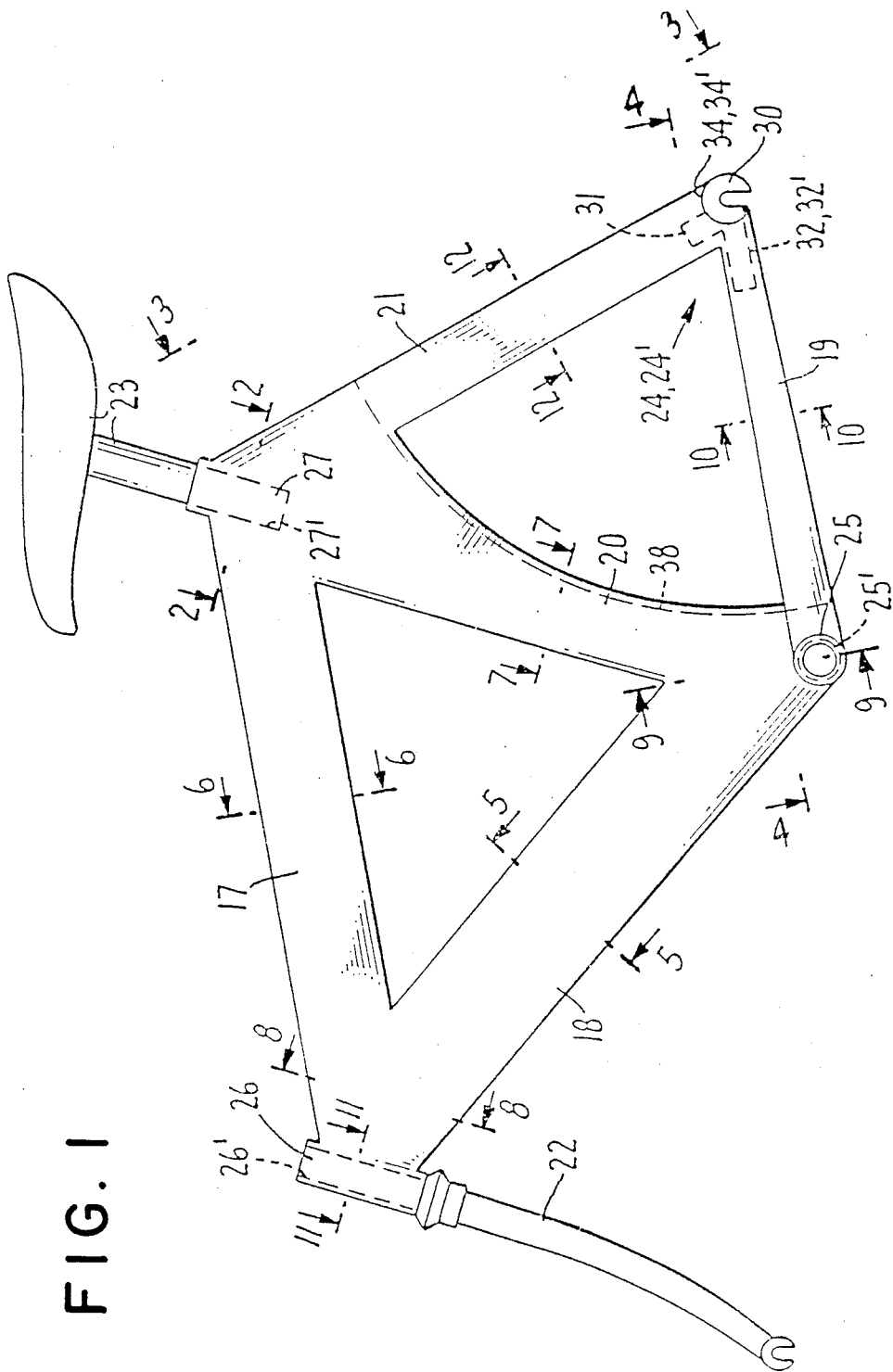
FIG. 1 is a side elevation view of a frame of the present invention showing a seat assembly and a front fork assembly in place for perspective.

FIGS. 1, 3 and 4 show a frame of the present invention, which comprises a generally hollow, tubular top tube portion 17 extending between steering support means 26 and seat support means 27; a generally hollow, tubular down tube portion 18 extending between the steering support means 26 and the pedal support means 25; a generally hollow, tubular seat tube portion 20 support means 25; a first and a second generally hollow, tubular chain stay portions 19, 19', the first such portion 19 extending from the left side of pedal support means 25 to the left side of rear wheel support means 24 and the second such portion 19' extending from the right side of pedal support means 25 to the right side of rear wheel support means 24'; and a first and a second generally hollow, tubular seat stay portions 21, 21', the first such portion 21 extending from the left side of seat support means 27 to the left side of rear wheel support means 24, and the second such portion 21', extending from the right side of seat support means 27 to the right side of rear wheel support means 24'.

In this configuration, the top tube portion 17, down tube portion 18, and seat tube portion 20 form an open front triangle, and the seat tube portion 20, chain stay portions 19, 19' and seat stay portions 21, 21' form a pair of open rear triangles. A right rear triangle is composed of right chain stay portion 19', right seat stay portion 21', and seat tube portion 20, and a left rear triangle is composed of left chain stay portion 19, left seat stay portion 21, and seat tube portion 20.

Steering support means 26 includes a hollow junction and associated elements for rotatably supporting at the bottom end a front fork assembly 22 and front wheel assembly and, at the top end, a handle bar assembly. Seat support means 27 includes a hollow junction and associated elements for adjustably receiving the post of a seat assembly. Pedal support means 25 includes a hollow junction and associated elements for supporting a pedal crank and chain wheel Each rear wheel support means 24, 24' include a hollow junction which includes a slotted rear wheel dropout having a head 30, 30', a first leg 31, 31' and a second leg 32, 32' to support the axle of a rear wheel assembly. The hollow junction of each rear wheel support means 24, 24' is preferably provided with a recess 34, 34' for receiving the head 30, 30' of the rear wheel dropout. The recess 34, 34' may be either cut out of a previously molded junction or, preferably, molded as part of the junction when the frame is constructed, with the dropout being placed in position after the frame material has been laid up but before the uncured frame is placed in the mold. The molded recess 34, 34' will preferably conform closely to the shape of dropout received such that the dropout will not move out of position, even in the absence of additional adhesion between the dropout and the molded recess 34, 34', thus providing a means for permanently and securely attaching a rear dropout to the frame at each rear wheel support means 24, 24'.

Additional support and stability is provided by first leg 31, 31', which is embedded within, and preferably attached by adhesive to the bottom portion of the generally hollow, tubular seat stay portion 21, 21', and by second leg 32 32', which is embedded within, and preferably attached by adhesive to the back portion of the generally hollow, tubular chain stay portion 21, 21'.

Likewise, a steering support sleeve 26' may be embedded within the steering support means 26, a seat support sleeve 27' may be embedded within seat support means 27, and a bottom bracket 25' for receiving the pedal crank axle (not shown) may be embedded within the pedal support means 25.

FIGS. 3 and 5 through 12 show the preferred cross-sectional shape of various portions of a unitary frame of the present invention. Although the cross-sectional shape of the various hollow, tubular portions may have a round aerodynamic shape, non-circular, air-foil type cross-sectional shapes are preferred. This aerodynamic cross-sectional shape preferably extends along a majority of the length of the elongated tubular portions, more preferably over substantially the entire length thereof. The preferred aerodynamic shapes are substantially symmetrical relative to an imaginary plane in which both the front and rear wheels rotate, preferably the plane passing through substantially the center of the geometric cross-sectional shape of the tire carried by the wheel assembly.

FIG. 7 generally illustrates the most preferred cross sectional shape for a tubular seat tube portion which includes a pair of trailing edges 37 and a concave rear wall 38 having a uniform cross-sectional curvature which substantially follows the cross-sectional curvature or outline of the tire of the wheel assembly rear wall 38 preferably also has a uniform longitudinal curve which follows the curve of the circumference of the wheel of the wheel assembly, as shown by the dashed, curved line in FIG. 1.

Regardless of the cross-sectional shape of the various portions of the frame of the present invention, sufficient clearance is provided between the surfaces of the various portions of the frame and the attached components, such as the rear wheel assembly and front wheel assembly, to permit normal operation of the bicycle without abnormal interference from the frame, for example, free tire rotation without contact between the tire surface and the frame surfaces.

A frame of the present invention may be formed from any suitable structural plastic, composite material or fiber reinforced plastic formed from strips of structural fibers, such as, for example, fiberglass and epoxy. Reinforcing fibers may be unidirectional or woven. Preferably a combination of fiberglass, carbon, and KEVLAR ® fibers are used to improve strength. In the most preferred embodiment, the reinforcing fibers are unidirectional and comprise about one-third glass, about one-third KEVLAR ® and about one-third carbon. The resin is preferably a moldable, heat curable epoxy resin. A long sheet packaged as a roll and comprising one or more layers of fabric made from the preferred reinforcing fibers and impregnated with the preferred resin is available from the Fiberite Company of Orange, Calif.

The present invention also provide, in a preferred embodiment, a method for manufacturing ultralight, unitary, generally hollow bicycle frames using structural fibers and resins, in which sufficient fibers and resins are initially shaped around mandrels having the approximate size and shape of the hollow interior of the various finished portions of the frame to achieve a cured frame wall thickness of from about 35 mils to about 125 mils. After this initial layup, the portions are removed from the mandrels and are united by hollow junctions made from corner patches comprising layers of resin impregnated fiber strips. Inflatable bladders are placed in the larger hollows formed in the top tube portion, down tube portion, and seat tube portion. A solid piece of foam made of a heat expandable resin composition is provided in the smaller hollows of the seat stay and chain stay portions. A heat expandable solid resin foam having a closed cellular structure and made from a polymethacrylimide is available under the trademark Rohacell from Cyro Industries of Orange, Conn. This resin foam is rigid at ambient temperatures, but softens to a plastic state and expands radially at the temperature for curing the frame.

The frame is then placed in a mold, and the bladders are inflated to compress the layers of fiber and resin against the walls of the mold. The curing process is thereafter initiated by applying heat to the mold to heat the frame to a temperature sufficient to cure the resin. For the preferred reinforcing fibers and resin obtained from the Fiberite Company, the frame is heated to about 250° F. to cure the resin. Further compression of the layers of fiber and resin occurs as the pressure within the bladder and the pressure caused by expansion of the foam in the seat stay and chain stay portions increases as the temperature rises. When curing is complete, the frame is removed from the mold, the inflatable bladders are removed, and any foam in the chain stay and seat stay portions may be removed by dissolution in an appropriate solvent.

The preferred method of molding the one-piece frame of the present invention uses a two-piece female mold having a right side and a left side, and interior cavities corresponding to the outer shape and size of the finished frame.

To manufacture a round tube frame, the top tube portion 17, the seat tube portion 20 and the down tube portion 18 are separately produced by wrapping fiber strips impregnated with the resin around a mandrel to provide a tubular structure. Depending upon the strength characteristics desired in the particular portions, some of the strips may be spirally wound and some may be wrapped lengthwise to provide multiple layers. Spiral windings of successive layers are preferably wound in opposite directions using long strips of resin impregnated fabric, preferably about 2 to 4 inches in width. Preferably, windings of a strip in the same layer are not overlapped. The mandrel outside diameter approximately corresponds to the finished inside diameter of the particular portion being produced. Each such portion is wrapped layer by layer over the mandrel. The number of layers used depends upon the desired wall thickness of the particular portion in the finished frame. For example, about eight layers have been found to produce a wall thickness in the finished frame of about 60 mils. Following wrapping, the tubular portions are slid axially off the mandrel.

The direction of wrapping the layers in relation to the longitudinal axis of each portion is important. When the preferred unidirectional fibers are used for the top tube portion 17, the down tube portion 18, the seat stay portions 21, and the chain stay portions 19, about one-fourth to about one-half of these fibers may be positioned at an angle between 0 and 45 degrees, preferably about 45 degrees, relative to the longitudinal axis of these elongated portions, with the remaining fibers being generally parallel to the longitudinal axis. This orientation of fibers is believed to improve the strength of these members for carrying bending and torsional stresses. Thus, for example, in a frame employing 8 layers of resin impregnated fiber, two layers oriented at a 45 degree angle relative to the longitudinal axis will provide 25% angled fibers and 75% longitudinal fibers. It is also clear that layers can be wrapped so that one 45 degree layer is set at a 90 degree angle relative to the previous 45 degree layer. In the seat tube portion 20, the unidirectional fibers are preferably substantially all parallel to the longitudinal axis.

The chain stay portions 19, 19' and seat stay portions 21, 21' are preferably formed by wrapping resin impregnated fiber strips around a low density solid foam core having the approximate shape and size of the interior of the finished chain stay portions 19, 19' and seat stay portions 21, 21'. The solid foam core becomes sufficiently plastic upon being heated to expand without rupture of its internal structure which comprises small closed cells of resin containing a gas.

After initial layup of the individual portions, the portions are cut to size, if necessary, and inflatable bladders are placed inside top tube portion 17, down tube portion 18, and seat tube portion 20. As illustrated in FIG. 15-18, patches 54 of resin impregnated fiber material are then used to unify the portions and form the common junctions for the rear wheel support means 24, 24', pedal support means 25, steering support means 26, and seat support means 27. Approximately one half of each patch 54 is preferably laid up as a section in a corresponding half of the mold with a sufficient overlap between the upper and lower sections of the patch to unite the two sections upon curing. A half-inch overlap, for example, has been found to produce satisfactory results. The patch sections are laid up in the mold before the corresponding preformed tube portions are placed therein and the patches are cut so that they overlap an end of the corresponding preformed tube portion. An overlap of from about one inch to about four inches, for example, has been found to satisfactorily unify the portions. Alternatively, the patches may be formed around the ends of the tube portions on a table, and the frame thus assembled is then placed in the mold. Any metal sleeves, for example, the seat support sleeve 27', head tube support sleeve 26', rear dropouts and bottom bracket 25' are embedded at this time For example, the legs 31, 31' and 32, 32' of the rear dropouts are inserted in the ends of seat stay portions 21, 21' and chain stay portions 19, 19', and embedded therein using the resin used to impregnate the fiber strips, before the recess 34, 34' of the rear wheel support means 24, 24' is formed to receive head 30, 30'.

The entire assembly is then laid into one half of the mold and the second half of the mold is joined with the first half of the mold, holding the uncured frame in the interior cavity. A single bladder is preferably used for the top and down tube portions and a second bladder for the seat tube portion. The bladders are inflated to from about 15 psig to about 500 psig, and preferably to about 100 psig, through an end of each bladder which extends through the mold to the outside from inside the large portions of the frame. Heat is applied to the mold to cure the resin and expand the foam in accordance with the resin manufacturer's recommendations For example, when a preferred fiber and resin from the Fiberite Company is used, the mold is heated to a temperature of about 250°. The internal pressure from the bladder and from the expanding foam within the seat stay and chain stay portions compresses the fiber/resin layers together and against the surface of the mold as the resin cures.

When the resin is cured, the mold is cooled and opened, and the unitary frame is removed. The bladders are deflated and may be removed or, because of their light weight, may be left within the hollow of the large members. The expanded foam may be removed from the seat stay and chain stay portions by dissolution in an appropriate solvent.

To produce a frame with portions having a more aerodynamic cross section, the same basic procedure is followed with some variation. While the top tube portion 17 is preferably wrapped on a mandrel, and the chain stay portions 19, 19' and seat stay portions 21, 21' are preferably wrapped on a low density foam core as discussed above, the down tube portion 18 and the seat tube portion 20 are preferably formed from resin impregnated strips of a multi-layer fabric of fiber and resin materials laid directly in each half of the mold. The width of the strips in the first half 40 of the mold are about equal to half of the circumference of the finished portion, while the width of the strips in the overlap on all sides for uniting the two halves of the portions in the mold. For example, a half-inch overlap on all sides has been found to provide a satisfactory overlap. The multi-layer fiber and resin fabric is composed of individual layers or plies of unidirectional fibers, and the orientation of the layers in the multi-layer fabric can be changed to optimize strength as discussed above. The number of layers to be used will depend upon the desired wall thickness of the particular portion of the finished frame. As discussed above, 8 layers will produce a finished wall thickness of about 60 mils, which provides satisfactory strength for most purposes.

Figure 13:
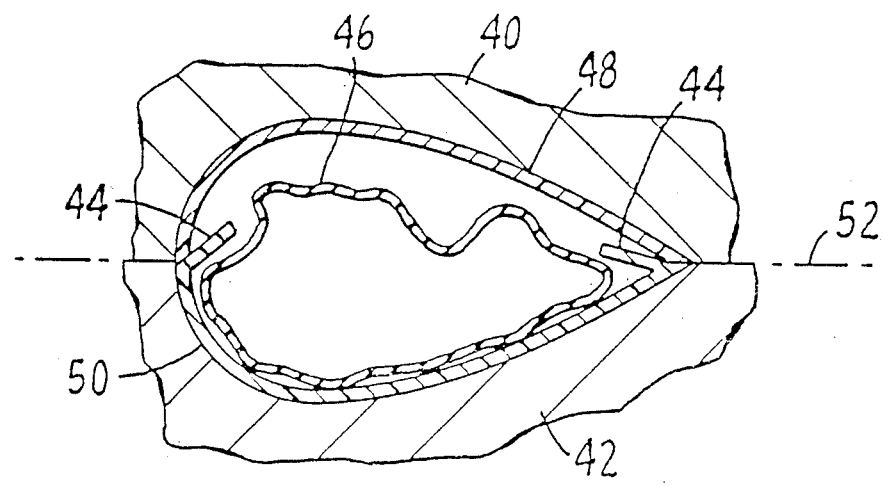
FIG. 13 is a fragmentary sectional view of the seat tube portion or down tube portion of a frame of the present invention within a mold and before curing the composite materials.
Figure 14:
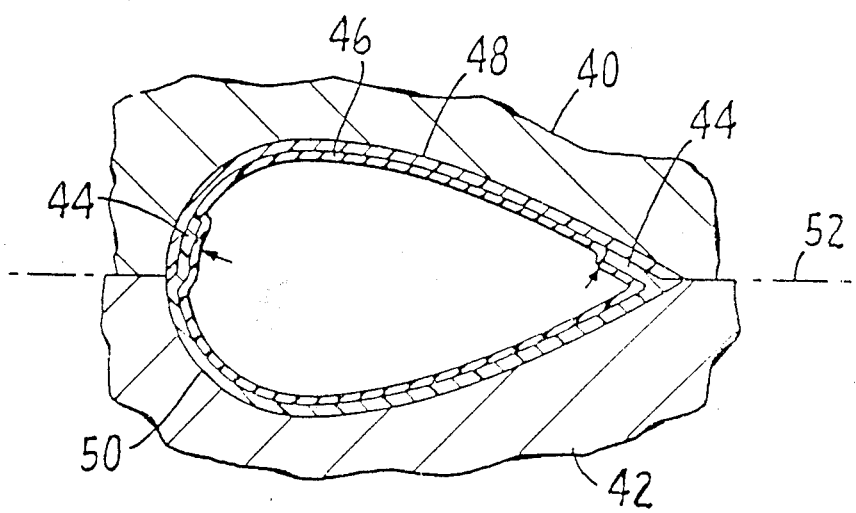
FIG. 14 is a fragmentary sectional view of the seat tube portion or down tube portion of a frame of the present invention within a mold and during the curing of the composite materials.

Patches 54 of resin impregnated fiber material are similarly laid into each half of the mold to form half 24, 24', pedal support means 25, steering support means 26, and seat support means 27. Any desired metal inserts such as head tube 26', are emplaced in these common junctions in one mold half, preferably in the second or lower half 42 as shown in FIGS. 16 and 18. The pre-wrapped top tube portion 17 is then laid in place in one mold half, preferably second half 42, and one patch 54 is wrapped around one end of tube portion 17 and one end of seat tube portion 20 and another patch 54 is wrapped around the other end of tube portion 17 and one end of the down tube portion 18 to provide common hollow junctions uniting these portions The chain stay portions 19, 19' and the seat stay portions 21, 21' are laid, one each in their respective positions in each half of the mold such that in either mold half one end of each seat stay portion 21, 21' is wrapped by the hollow junction patch of the seat support means 27, while the other end is wrapped by the hollow junction patch of the rear wheel support means 24, 24', and such that one end of each chain stay portion 19, 19' is wrapped by a hollow junction patch of the pedal support means 25 while the other end is wrapped by a hollow junction patch of the rear wheel support means 24, 24'. One or more bladders are placed in the mold half having the wider strips of material in the down tube portion and the seat tube portion and slid into the mandrel wrapped top tube portion The overlap on each side is draped over the bladder before the two mold halves are joined. A cross-sectional view of the two joined halves is shown in FIG. 13. The bladder 46 is then inflated through an end extending through the mold to from about 15 psig to about 500 psig. Thus as shown in FIG. 14, pair of overlaps 44—44 of second frame half 50 against first frame half 48, integrally sealing the two sections together with a corresponding pair of pressure molded junctures as the frame cures.

As discussed above, heat is desirably applied to cure the resin, and the pressure exerted by bladder 46 and by the expanding foam cores of the seat stay and chain stay portions compresses the fiber/resin composite against the inside surface of the mold as the resin cures. Following cure, the one-piece frame is removed from the mold, and the bladder and foam cores are optionally removed. A frame thus formed has a wall thickness ranging from about 35 mils to about 125 mils, depending upon the number of layers of resin impregnated fiber used initially to form the various portions of the frame. Thus, the wall thickness of the various portions can be selectively increased or decreased during manufacture, depending upon the strength required The result is a bicycle frame having an unusually low weight ("ultralight") while providing unexpectedly high levels of strength, rigidity and durability. The unitary, one-piece design further provides unusually low aerodynamic drag of a level formerly achievable only with a monocoque-type frame but without the cross-wind sensitivity of monocoque-types frames, and eliminates the problems of joint failures commonly experienced by conventional frame assemblies.

While not preferred from a structural standpoint, one skilled in the art will recognize that certain production advantages may arise by applying the methods disclosed above to the independent production of major portions of a bicycle frame. Thus, these methods can be used to produce a unitary main component of the bicycle frame comprising at least two hollow tube portions integrally united by a hollow junction. For example, a unified front triangle could be produced and the frame completed by adding a unified stay assembly comprising the two chain stay portions 19, 19', the two seat stay portions 21, 21', and the common junctions 34, 34'. The connection can be made by producing and curing the unified stay assembly separately, and then placing the pre-cured stay assembly in the patches used to form common junctions 25 and 27 and wrapping them into the uncured wrapped stay portions. Alternatively, the connection between the cured and uncured portions can be made by providing the junctions between the portions to be joined with slip fit connections such as that illustrated in FIG. 19 which shows a hollow projecting stub 56 over which the end of the precured tubular portion may be slid. For example, the chain stay portions 19, 19' and seat stay portions 21, 21' with hollow common junctions 34, 34' may be molded and cured separately and then connected to the uncured front triangle by providing hollow stubs 56 projecting rearwardly from common junctions 27 and 25, over which the ends of the chain stay portions 19, 19' and the ends of the seat stay portions 21, 21' may be slid. The hollow stubs are provided with an expansion means for pressing the stubs 56 against the interior surface of the ends of the precured portions to form a pressure molded juncture bonding the stubs to the ends of the precured portions final cure of the front triangle. When this means of connection is used, the stubs extend into the ends of the hollow attached portions preferably at least about one inch and more preferably at least about two inches, and may have additional resin placed on the surface of the stubs 56 at the interface between the stubs and the inner surface of the attached, precured hollow portions. The entire assembly is then cured as disclosed above.

Following cure, the unified stay assembly will be rigidly attached to the front triangle by the adhesive force of the cured resin. Although joints will exist where the seat stays 21, 21' and the chain stays 19, 19' are joined to the front triangle, such joints will not be visible from the exterior.

Alternatively, a pre-cured stay assembly can be rigidly attached to a front triangle which is produced and cured as disclosed above using a means of connection such as that illustrated in FIG. 19. Rigid attachment is assured by providing the ends of seat stays 21, 21', the ends of chain stays 19, 19' and the common junctions 27, and 25 with slip fit joints. Thus, as illustrated in FIG. 19, in a frame of the present invention it is possible to provide junction 25 with a rearwardly projecting stub connector 56 having an outer diameter only slightly smaller than the inner diameter of the end of chain stay 19, allowing the end of chain stay 19 to slip over connector 56 and abut the front triangle at the rear edge of common junction 25. A rigid and permanent attachment is obtained by applying a suitable adhesive to the interface between the outer surface of connector 56 and the inner surface at the end of chain stay 19. This adhesive may be the same resin used to impregnate the fibers from which the walls of the frame are preferably molded. The other portions of the unified rear triangle can be similarly attached to the front triangle to complete the bicycle frame. Thus, a frame can be obtained which has fewer joints than a conventional bicycle and which may provide production advantages over an entirely unified frame.

One skilled in the art will recognize at once that it would be possible to construct the frame of the present invention from a variety of materials and to modify the process in a variety of ways. While the preferred embodiment has been described in detail, and own in the accompanying drawings, it will be evident that various further modifications are possible without departing from the scope of the invention.

I claim:

1. A cycle frame connecting at least two support means of the group comprising a steering support means for supporting a fork assembly, a seat support means for supporting a seat assembly, a pedal support means for supporting a pedal assembly, and a wheel support means for supporting a wheel assembly; said cycle frame being characterized in that:

a generally hollow unitary frame component extends longitudinally between and connects said at least two support means and comprises at least two adjacent wall sections each comprising at least one molded layer of fibrous material impregnated with a synthetic resin, said adjacent wall sections being integrally united by at least one pressure molded juncture to provide a unitary wall of said resin impregnated fibrous material around an interior cavity of said unitary frame component, said at least one pressure molded juncture comprising overlapping layers of said resin impregnated fibrous material provided by overlapped parts of said adjacent wall sections.

2. A cycle frame according to claim 1 further characterized in that said interior cavity and said pressure molded juncture are elongated in the longitudinal direction of said unitary frame component, and said pressure molded juncture integrally unites said two sections to form a generally hollow tubular portion having a unitary wall of said resin impregnated fibrous material extending transversely around said elongated interior cavity of said unitary frame component.

3. A cycle frame according to claim 1 further characterized in that said pressure molded juncture is elongated in the longitudinal direction of said unitary frame component and integrally unites said two sections to form a generally hollow junction having a unitary wall of said resin impregnated fibrous material extending transversely around said interior cavity of said unitary frame component.

4. A cycle frame according to any one of claims 1-3 further characterized in that said two adjacent wall sections comprise different portions of a single elongated strip of resin impregnated fabric wrapped lengthwise to provide overlapped edge parts, said edge parts being integrally united by said pressure molded juncture and said respective sections extending transversely around opposite sides of said interior cavity.

5. A cycle frame according to claim 1 further characterized in that said unitary frame component comprises at least one generally hollow junction section and at least one generally hollow tubular section, said pressure molded juncture of overlapping layers extending around said interior cavity transversely to the longitudinal direction of said unitary frame component and integrally uniting said at least one junction section and said at least one tubular section.

6. A cycle frame according to claim 5 further characterized in that said tubular section comprises at least one elongated strip of said resin impregnated fibrous material, said junction section comprises at least one patch of said resin impregnated fibrous material, said elongated strip is integrally united to said patch by said pressure molded juncture such that said unitary wall comprises said tubular section and said junction section, and said elongated strip and said patch are separate pieces cut from a continuous sheet of resin impregnated fabric.

7. A cycle frame according to claim 5 or claim 6 further characterized in that said unitary frame component comprises a second pressure molded juncture, said second pressure molded juncture being elongated in the longitudinal direction of said unitary frame component and integrally uniting two subsections of said generally hollow tubular section and two subsections of said generally hollow junction section to provide said unitary wall of resin impregnated fibrous material, said unitary wall extending transversely around opposite sides of said interior cavity of said unitary frame component.

8. A cycle frame according to claim 5 or claim 6 further characterized in that said unitary frame component includes at least one generally hollow tubular portion comprising at least one spirally wound and molded layer of fibrous material impregnated with a synthetic resin.

9. A cycle frame according to claim 8 further characterized in that said unitary frame component includes at least one generally hollow tubular portion comprising at least two successive spirally wound and molded layers of fibrous material impregnated with a synthetic resin, each of said successive layers comprising a spiral winding of an elongated strip of resin impregnated fabric spirally wound in a direction opposite to the spiral winding of the other layer.

10. A cycle frame according to any one of claims 1-3 further characterized in that said sections comprise separate pieces of resin impregnated fibrous material forming opposite halves of at least a portion of said generally hollow unitary frame component, the transverse widths of said pieces of fibrous material being sufficient to form two pairs of overlapped edge parts, each of said pairs of overlapped edge parts providing a pressure molded juncture in opposing relation to a pressure molded juncture provided by the other pair, and said pressure molded junctures integrally uniting said opposite halves to provide a unitary wall extending around opposite sides of said interior cavity of said generally hollow unitary frame component.

11. A cycle frame according to claim 10 further characterized in that said unitary frame component comprises at least one generally hollow junction connected to at least one generally hollow tube portion, said tube portion comprising at least one elongated strip of resin impregnated fibrous material and said hollow junction comprising at least one patch of said resin impregnated fibrous material, said elongated strip being integrally united to said patch by a third pair of overlapped edge parts providing a third pressure molded juncture by which said unitary wall integrally unites said tube portion and said hollow junction.

12. A cycle frame according to claim 4 further characterized in that said generally hollow unitary frame component comprises a generally hollow top tubular portion extending between a member of said steering support means and a member of said seat support means, a generally hollow down tubular portion extending between a member of said steering support means and a member of said pedal support means, a generally hollow seat tubular portion extending between a member of said seat support means and a member of said pedal support means, a generally hollow common junction integrally uniting said top tubular portion and said down tubular portion and carrying said steering support member, a generally hollow common junction integrally uniting said top tubular portion and said seat tubular portion and carrying said seat support member, and a generally hollow common junction integrally uniting said seat tubular portion and said down tubular portion and carrying said pedal support member, said integrally united tubular portions and common junctions forming a generally hollow unitary front triangle component.

13. A cycle frame according to claim 5 further characterized in that said generally hollow unitary frame component comprises a generally hollow seat tubular portion extending between a member of said seat support means and a member of said pedal support means, a pair of generally hollow chain stay tubular portions extending between a member of said pedal support means and members of said wheel support means, and a pair of generally hollow seat stay tubular portions extending between a member of said seat support means and members of said wheel support means, a generally hollow common junction integrally uniting said seat tubular portion and one end of each of said chain stay tubular portions and carrying said pedal support member, a generally hollow common junction integrally uniting said seat tubular portion and one end of each of said seat stay tubular portions and carrying said seat support member, and a pair of generally hollow common rear junctions each integrally uniting the other end of one of said chain stay tubular portions and the other end of a corresponding one of said seat stay tubular portions and carrying one of said rear wheel support members of said wheel support means; said integrally united generally hollow unitary rear triangle component with one of said chain stay tubular portions and said corresponding seat stay tubular portion on either side of said wheel assembly.

14. A cycle frame according to claim 5 further characterized in that said generally hollow unitary frame component comprises a generally hollow top tubular portion extending between a member of said steering support means and a member of said seat support means, a generally hollow down tubular portion extending between a member of said steering support means and a member of said pedal support means, a generally hollow seat tubular portion extending between a member of said seat support means and a member of said pedal support means, a pair of generally hollow chain stay tubular portions extending between a member of said pedal support means and members of said wheel support means, a pair of generally hollow seat stay tubular portions extending between a member of said seat support means and members of said wheel support means, a generally hollow common junction integrally uniting said top tubular portion and said down tubular portion and carrying said steering support member, a generally hollow common junction integrally uniting said top tubular portion, said seat tubular portion and one end of each of said pair of seat stay tubular portions and carrying said seat support member, and a generally hollow common junction integrally uniting said down tubular portion, said seat tubular portion and one end of each of said pair of chain stay tubular portions and carrying said pedal support member, said integrally united tubular portions and common junctions forming a generally hollow main unitary frame component in which said top tubular portion, said down tubular portion and said seat tubular portion form an open front triangle, in which said seat tubular portion, said chain stay tubular portions and said seat stay tubular portions form an open rear triangle with one of said chain stay tubular portions on either side of said wheel assembly, in which said seat tubular portion provides a common side of each of said front and rear triangles, and in which the outer edges of the other two sides of said front triangle and the other two sides of said rear triangle substantially define an outline of the geometry of said frame as viewed from one side thereof.

15. A cycle frame according to claim 14 further characterized in that said generally hollow unitary frame component comprises a pair of generally hollow common rear junctions each integrally uniting the other end of one of said chain stay tubular portions and the other end of said corresponding seat stay tubular portion and carrying one of said rear wheel support members of said wheel support means, said integrally united tubular portions and common junctions forming an entirely integral one-piece frame.

16. A cycle frame according to claim 14 further characterized in that said generally hollow unitary frame component comprises a pair of stay connecting means each connecting the other end of one of said chain stay tubular portions and the other end of said corresponding seat stay tubular portion and including one of said rear wheel support members of said wheel support means.

17. A cycle frame according to any one of claims 12–14 further characterized in that at least a portion of said generally hollow unitary frame component has a non-circular aerodynamic cross-sectional shape resembling a teardrop.

18. A cycle frame according to claim 1 further characterized in that at least a portion of the interior cavity of said generally hollow unitary frame component is filled by a separate core member comprising a foamed synthetic resin.

19. A cycle frame according to claim 1 further characterized in that at least a portion of the interior cavity of said generally hollow unitary frame component contains a bladder of flexible material.

20. A cycle frame according to claim 1 further characterized in that said resin impregnated fibrous material comprises structural fibers impregnated with a heat curable resin.

21. A cycle frame according to claim 1 further characterized in that said resin impregnated fibrous material comprises multiple layers of unidirectional fibers, and the unidirectional fibers of different layers extend longitudinally in different directions relative to the longitudinal direction of said unitary frame component.

22. A cycle frame according to claim 1 further characterized in that at least part of one or more of said steering support means, said seat support means, said pedal support means and said wheel support means is carried in said interior cavity of said unitary frame component and is embedded in said unitary wall surrounding said interior cavity.

* * * * *